(12) United States Patent
Lyons et al.

(10) Patent No.: US 9,851,111 B1
(45) Date of Patent: *Dec. 26, 2017

(54) THERMAL REDUCTION THROUGH ACTIVITY BASED THERMAL TARGETING TO ENHANCE HEATING SYSTEM EFFICIENCY

(71) Applicant: C. Cowles & Co., North Haven, CT (US)

(72) Inventors: Richard A. Lyons, Madison, CT (US); Christopher L. Murray, West Haven, CT (US); William Montgomery, Madison, CT (US); Robert Schiller, Niantic, CT (US); Timothy Van Leeuwen, Naugatuck, CT (US)

(73) Assignee: C. Cowles & Company, North Haven, CT (US)

( * ) Notice: Subject to any disclaimer, the term of this patent is extended or adjusted under 35 U.S.C. 154(b) by 638 days.

This patent is subject to a terminal disclaimer.

(21) Appl. No.: 14/339,483

(22) Filed: Jul. 24, 2014

Related U.S. Application Data (63) Continuation of application No. 12/609,782, filed on Oct. 30, 2009, now Pat. No. 8,844,834.

(51) Int. Cl.
  *F23N 1/08* (2006.01)
  *G05D 23/00* (2006.01)
  *F24D 19/10* (2006.01)
  *F24D 3/02* (2006.01)

(52) U.S. Cl.
  CPC ........... *F24D 19/1009* (2013.01); *F24D 3/02* (2013.01); *F24D 2220/042* (2013.01)

(58) Field of Classification Search
  CPC .... F24D 19/1009; F24D 19/1015; F24D 3/02; F23N 1/08; F24H 9/2078; F24H 9/2035
  USPC ........ 236/91 F, 46 R, 14, 19, 20 R, 9 A, 9 R
  See application file for complete search history.

(56) References Cited

U.S. PATENT DOCUMENTS

| | | | | |
|---|---|---|---|---|
| 4,433,810 A | * | 2/1984 | Gottlieb | F24D 19/1012 236/9 A |
| 4,522,333 A | * | 6/1985 | Blau, Jr. | F24D 17/0078 236/20 R |
| 4,685,616 A | * | 8/1987 | Stein | F23N 5/022 236/46 F |

(Continued)

*Primary Examiner* — Kun Kai Ma
(74) *Attorney, Agent, or Firm* — DeLio, Peterson & Curcio LLC; Robert Curcio (57) ABSTRACT

Thermal targeting technology is used to continuously adjust boiler target temperature to the minimum necessary to satisfy the required heating load. Responsive to and initiated by a first call for heat, boiler target temperature is reduced by a predetermined amount upon or subsequent to the call for heat. Once the boiler temperature reaches this new target, a call timer is activated. If demand for heat is satisfied before a time set point is reached, the system ceases providing additional heat energy until the next heat demand. Responsive to and initiated by a next call for heat, the boiler target temperature is again reduced by the predetermined amount upon or subsequent to this next call for heat. Each time the heat demand is satisfied within the predetermined time interval, the boiler target temperature is reduced. If heat demand is not satisfied, a thermal boost is provided at set time intervals until the call for heat is removed.

22 Claims, 3 Drawing Sheets

(56) References Cited

U.S. PATENT DOCUMENTS

| | | | | |
|---|---|---|---|---|
| 4,844,335 A * | 7/1989 | McKinley | ......... | G05D 23/1934 236/46 R |
| 4,850,310 A * | 7/1989 | Wildgen | ................ | F23N 1/002 122/446 |
| 5,219,119 A * | 6/1993 | Kasper | ............... | G05D 23/1904 165/239 |
| 5,337,955 A * | 8/1994 | Burd | ................... | F24D 19/1009 236/91 B |
| 5,424,554 A * | 6/1995 | Marran | .................. | F23N 5/082 250/554 |
| 5,470,019 A | 11/1995 | Martensson | | |
| 5,692,676 A | 12/1997 | Walker | | |
| 5,775,582 A * | 7/1998 | Hammer | ................ | F23N 1/082 122/446 |
| 5,822,997 A * | 10/1998 | Atterbury | .............. | F25B 13/00 165/239 |
| 5,971,284 A * | 10/1999 | Hammer | ................ | F23N 1/002 165/267 |
| 6,402,043 B1 * | 6/2002 | Cockerill | .......... | G05D 23/1919 165/11.1 |
| 6,409,090 B1 | 6/2002 | Gilvar | | |
| 7,500,453 B2 * | 3/2009 | Lindberg | ............ | F24D 19/1009 122/14.2 |
| 8,070,482 B2 * | 12/2011 | Fuentes | ................... | F23N 3/002 236/14 |
| 8,229,704 B1 * | 7/2012 | Hammer | ................ | F23N 5/022 702/122 |
| 8,849,464 B2 * | 9/2014 | Fildes | .................... | F23N 1/082 700/277 |
| 9,217,654 B2 * | 12/2015 | Besore | ................... | F24H 1/124 |
| 2006/0243816 A1 * | 11/2006 | Teti | .................... | F24D 19/1009 237/8 R |
| 2007/0084942 A1 * | 4/2007 | Moore | .................. | F02G 1/043 237/19 |
| 2007/0177857 A1 * | 8/2007 | Troost | ...................... | F24H 9/20 392/345 |
| 2008/0251590 A1 * | 10/2008 | Arneson | ............. | F24F 11/0012 236/1 B |
| 2009/0001186 A1 | 1/2009 | Cohen | | |
| 2009/0056649 A1 * | 3/2009 | MacKenzie | ............ | F22B 37/42 122/504 |
| 2009/0234513 A1 * | 9/2009 | Wiggins | ............. | F24D 19/1051 700/300 |
| 2010/0116224 A1 * | 5/2010 | Leeland | ................ | F24H 9/2035 122/14.21 |
| 2010/0280665 A1 * | 11/2010 | Fildes | .................. | F24H 9/2035 700/275 |
| 2010/0280679 A1 * | 11/2010 | Fildes | ............... | G05D 23/1905 700/299 |

* cited by examiner

THERMAL REDUCTION THROUGH ACTIVITY BASED THERMAL TARGETING TO ENHANCE HEATING SYSTEM EFFICIENCY

BACKGROUND OF THE INVENTION

1. Field of the Invention

The present invention relates to a method and apparatus for improving the efficiency of heating systems, specifically heating systems that use a boiler to heat an energy transfer medium, such as a fluid, for circulation through heat exchangers in residential and commercial buildings.

More specifically, the present invention relates to an automatic control of the boiler water target temperature for an improved hot water heating system with the object of enhancing energy efficiency during operation in diverse and varying temperature environments through the systematic reduction of the boiler target temperature predicated upon heating efficiency factors and external temperature conditions.

2. Description of Related Art

Hot water heating systems are closed-loop, fluid circulating systems that provide heat from an energy transfer medium, such as a fluid, and pump or circulate the energy transfer medium to an entire structure or zoned sections of a structure that requires a temperature increase greater than the external ambient temperature.

A boiler heating system operates by way of heating an energy transfer medium to a preset temperature and circulating that fluid throughout a building or structure typically through heat exchangers, such as radiators, baseboard heaters, or the like, to warm the structure or at least a portion of the structure. The fluid can be heated by any energy source, such as gas, or fuel oil, to name a few. The fluid is in an enclosed system and circulated throughout the structure within ingress and egress flow lines, such as conduits, usually by means of a motorized pump or circulator.

When there is a call or demand for heat, such as a low thermostat reading in a zoned space within a structure that has realized a drop in temperature and requires more heat, or a low thermostat reading within or near the boiler that registers a drop in transfer medium temperature due to a demand in usage, such as heating domestic hot water and having the temperature of the energy transfer medium decline as a result, a burner is fired within the boiler to heat the energy transfer medium until the call for heat is removed or a predetermined boiler transfer medium temperature is reached, whichever comes first. The zoned spaces are responsive to changing ambient weather conditions in that there occurs continuously heat exchange between these zones and prevailing ambient weather conditions. Once the demand for heat is satisfied, the demand is removed, and the heating cycle repeats.

The efficiency of a boiler can be directly affected by the change in temperature of the outside environment. The ideal situation is to establish a lower boiler water temperature in warmer weather when the boiler is in less demand, and higher boiler water temperature in colder weather, when the demand is high, dependent in part upon the thermal efficiency of the space being heated. A higher temperature heat delivery system will provide heat to a space more quickly, but is less efficient during warmer ambient conditions insomuch as the burner fires for longer periods of time or more often to keep the boiler water temperature unnecessarily high.

With energy efficiency becoming of paramount importance, it is desirable to have a hot water heating system that can automatically adjust to changing ambient conditions in a manner that allows the boiler to operate more efficiently.

Furthermore, the widely accepted technology of an outdoor reset control requires the installation of a temperature sensor outside, typically to a Northern exposure location. Installation of this system is labor-intensive and time consuming. Moreover, building constraints will affect structural placement of the outdoor reset control system. Additionally, without explicit building information, outdoor reset controls are typically conservatively set, resulting in a less efficient operation.

Many prior art attempts have been made to control a heating system and make the heating system more efficient by optimizing the heating cycle. In many circumstances, control circuitry and logic dictate the use of lower temperature boiler water for milder ambient weather than that used or required under colder and more severe weather conditions. These systems are uniquely different in that the methods for making a boiler responsive to repetitive or prolonged calls or demands for heat employ different algorithms and logic, all differing in implementation and having various degrees of complexity.

For example, in U.S. Pat. No. 6,402,043, issued to Cockerill on Jun. 11, 2002, entitled "METHOD FOR CONTROLLING HVAC UNITS," the temperature set point of an HVAC unit is adjusted using two sensors. One sensor monitors the thermostat in a controlled environment, and a second sensor measures the temperature of the energy transfer medium. An ideal HVAC demand model is created for the controlled environment. The first sensor reads thermostat activity at set intervals over a defined period of time. At the conclusion of the defined time period, a microprocessor creates an actual demand model based on the recorded thermostat activity. The actual HVAC demand model is then compared to the ideal HVAC demand model. A temperature change factor is calculated from the comparison. An optimum temperature set point for the HVAC unit is then determined. The microprocessor adjusts the actual temperature set point of the HVAC unit to the optimum temperature set point. The HVAC unit is then activated whenever the temperature of the energy transfer medium deviates from the temperature set point by more than a predetermined set point range. The efficiency of this system is dependent upon the accuracy of the ideal demand model created for a given structure.

In U.S. Pat. No. 6,409,090, issued to Gilvar, et al., on Jun. 25, 2002, entitled "SELF-OPTIMIZING DEVICE FOR CONTROLLING A HEATING SYSTEM," the heating unit has an ON state initiated when a measurable variable of the heating medium, such as a temperature reading, reaches a maximum level. Once the heating unit is signaled ON, a timer measures the length of time from initiation of the OFF state of the heating element until the temperature of the heating medium decreases below a predetermined minimum level. A processor then determines a delay time which delays the initiation of the next ON state by the delay time amount. This is distinctly different from systems that do not use a delayed initiation.

In contrast to reducing the temperature of the energy transfer medium, in U.S. Pat. No. 4,433,810, issued to Gottlieb on Feb. 28, 1984, entitled "HOT WATER HEATING SYSTEM," operation of the heat exchange medium's circulating pump is controlled. Control circuitry connects to both the circulating pump and the boiler and works to lower the boiler operating temperature when detecting a significantly longer period of non-operation of the pump than a period of operation for a given selected period of time. For a predetermined time interval, the operation and non-operation of the pump is monitored. If the pump is non-operational during this time period, this signifies that for the prevailing ambient weather conditions the temperature level of the hot water being circulated through the heat system is unnecessarily high. In these instances, where the pump has only nominal operation, the operating temperature level of the boiler is lowered because the exchange medium is running too hot. Importantly, it is the operation and non-operation of the circulating pump that governs the temperature control. A consequence of the reduction in temperature of the heat exchange medium is that the circulating pump will remain ON for a longer period of time than prior to the temperature reduction. In this manner, a continuously running pump represents an optimum condition. In comparison, the present invention reduces the boiler target temperature on a demand for heat, and not simply for a period of time of non-operation of the circulator pump.

In U.S. Pat. No. 5,692,676, issued to Walker on Dec. 2, 1997, entitled "METHOD AND APPARATUS FOR SAVING ENERGY IN CIRCULATING HOT WATER HEATING SYSTEMS," a method is taught for automatically adjusting the temperature of the boiler water in a hot water heating system in proportion to changes in the heat demand rate in the space being heated, wherein the change in heat demand rate is specifically established on the basis of the off-time interval in the cyclic OFF and ON activation of the pump which circulates the water.

SUMMARY OF THE INVENTION

Bearing in mind the problems and deficiencies of the prior art, it is therefore an object of the present invention to provide a more efficient operating method for a boiler heating system that seeks to acquire and utilize a lower boiler target temperature as a function of each call or demand for heat.

It is another object of the present invention to incorporate a thermal boost to the heating system when a demand for heat cannot be timely accommodated, while simultaneously allowing for thermal reduction of the heating system when the demand for heat is reduced.

It is a further object of the present invention to decrease the boiler target temperature when the demand for heat is reduced, and within a predetermined period of time between calls for heat.

Still other objects and advantages of the invention will in part be obvious and will in part be apparent from the specification.

The above and other objects, which will be apparent to those skilled in the art, are achieved in the present invention which is directed to, in a first aspect, a method of improving efficiency of a boiler heating system including adjusting boiler target temperature during heating system operation, the method comprising: reducing the boiler target temperature a predetermined amount to a reduced target temperature, $\Delta T_{reduce}$, such that the reducing is responsive to and initiated by a call for heat, and occurs upon or subsequent to the call for heat; and running the heating system at the reduced target temperature.

If the call for heat is satisfied while running heating system at the reduced target temperature, the method includes measuring time from a point at which the call for heat is satisfied; and reducing the target temperature a predetermined amount, $\Delta T_{reduce}$, each time a predetermined set time interval, $t_{set2}$, is reached without a subsequent call for heat.

Moreover, if after a predetermined set time interval, $t_{set}$, the call for heat is unsatisfied at the reduced target temperature, the method of the present invention then increases the target temperature a predetermined amount, $\Delta T_{boost}$, and runs the heating system at the increased target temperature.

If, however, the call for heat remains unsatisfied after the target temperature has been raised the predetermined amount, $\Delta T_{boost}$, for the predetermined set time interval, $t_{set}$, measured from the increase in target temperature, the present invention increases the target temperature a predetermined amount, $\Delta T_{boost}$, each time the predetermined set time interval, $t_{set}$, is reached without having satisfied the call for heat; and runs the heating system at the increased target temperature.

Once the call for heat is satisfied, the method of the present invention reduces the target temperature the predetermined temperature amount, $\Delta T_{reduce}$, such that the reduction is responsive to and initiated by a subsequent call for heat, and occurs upon or subsequent to the subsequent call for heat.

The duty cycle of calls for heat may also be monitored such that if the duty cycle exceeds a predetermined value, the target temperature is no longer reduced upon subsequent calls for heat. If the duty cycle exceeds a predetermined value, the predetermined set time interval, $t_{set}$, is continued, disregarding interruptions in heat calls.

In a second aspect, the present invention is directed to a method of improving efficiency of a boiler heating system for heating a structure, the boiler heating system comprising: a burner; a controller in communication with the burner for adjusting boiler target temperature; a first temperature measurement device for measuring the boiler heating system temperature, the first temperature measurement device in communication with the controller; a second temperature measurement device for measuring temperature of the structure, the second temperature measurement device in communication with the controller; the method comprising: adjusting the target temperature during heating system operation, by reducing the target temperature a predetermined amount to a reduced target temperature, $\Delta T_{reduce}$, such that the reducing is responsive to and initiated by a call for heat, and occurs upon or subsequent to the call for heat, the call for heat triggered by the second temperature measurement device communicating with the controller; running the heating system at the reduced target temperature by having the controller communicate with and activate a circulator or the burner; if the call for heat is satisfied while running the heating system at the reduced target temperature: measuring elapsed time from a time at which a call for heat was satisfied; and reducing the target temperature a predetermined amount, $\Delta T_{reduce}$, each time a first predetermined set time interval is reached without a subsequent call for heat; if the call for heat is unsatisfied while running the heating system at the reduced target temperature: measuring elapsed time from a time when the target temperature was met; and increasing the target temperature a predetermined amount, $\Delta T_{boost}$, after the elapsed time equals to or exceeds a second predetermined set time interval; and running the heating system at the increased target temperature.

If the call for heat remains unsatisfied after the target temperature has been raised the predetermined amount, $\Delta T_{boost}$, at the second predetermined set time interval measured from the previous increase in target temperature, in this aspect the present invention increases the target temperature the predetermined amount, $\Delta T_{boost}$, each time the second predetermined set time interval is reached without having satisfied the call for heat; and runs the heating system at the increased target temperature.

Once the call for heat is satisfied, in this aspect the present invention reduces the target temperature the predetermined temperature amount, $\Delta T_{reduce}$, such that the reduction is responsive to and initiated by a subsequent call for heat, and occurs upon or subsequent to the subsequent call for heat.

In a third aspect, the present invention is directed to a method of improving the efficiency of a heating system comprising: setting a predetermined target temperature for an energy transfer medium within a boiler in the heating system; measuring a dynamic temperature of the energy transfer medium within the boiler as a function of time; responsive to and initiated by a demand for heat for a zoned space within a structure heated by the heating system: reducing the target temperature a predetermined amount upon or subsequent to the demand for heat; circulating the energy transfer medium through the heating system to at least one heat exchanger within the zoned space at the reduced target temperature; initiating a timer when the dynamic temperature of the energy transfer medium is approximately equal to the predetermined target temperature; if the demand for heat is satisfied while running the heating system at the reduced target temperature: measuring elapsed time from a point at which the call for heat is satisfied; and reducing the target temperature the predetermined amount, each time a first predetermined set time interval is reached without a subsequent call for heat.

If the call for heat is unsatisfied while running the heating system at the reduced target temperature, in this aspect the present invention measures elapsed time from when the dynamic temperature of the energy transfer medium is approximately equal to the reduced target temperature; sends a firing signal to a burner within the heating system if the dynamic temperature of the energy transfer medium within the boiler is less than the predetermined target temperature within a predetermined differential temperature limit for the energy transfer medium; increases the target temperature a predetermined amount, $\Delta T_{boost}$, after the elapsed time equals to or exceeds a second predetermined set time interval; and runs the heating system at the increased target temperature.

In a fourth aspect, the present invention is directed to a method of improving the efficiency of a heating system comprising: setting a predetermined temperature for a zoned space within a structure heated by the heating system; setting a predetermined target temperature for an energy transfer medium within a boiler in the heating system; measuring a dynamic temperature of the energy transfer medium within the boiler as a function of time; measuring a dynamic temperature of the zoned space as a function of time; triggering a call for heat upon a comparison of the temperature of the zoned space to the predetermined temperature for the zoned space, such that if the comparison is greater than a predetermined temperature difference the call for heat is initiated; responsive to and initiated by the call for heat: reducing the predetermined target temperature by a temperature reduction factor upon or subsequent to the call for heat; circulating the energy transfer medium through the heating system to at least one heat exchanger within the zoned space; and sending a firing signal to a burner within the heating system if the dynamic temperature of the energy transfer medium within the boiler is, within a predetermined differential temperature range, less than the predetermined target temperature minus the temperature reduction factor; initiating a timer when the dynamic temperature of the energy transfer medium is approximately equal to the predetermined target temperature minus the temperature reduction factor for the energy transfer medium; if the call for heat is satisfied within a first set time interval: reducing current target temperature by the temperature reduction factor, and continuing to reduce the current target temperature by the temperature reduction factor each time the first set time interval has elapsed without a subsequent call for heat.

In a fifth aspect, the present invention is directed to a method of improving efficiency of a boiler heating system including the steps of: providing a thermal reduction to the energy transfer medium within the boiler responsive to and initiated by a demand for heat to the heating system, or when the demand for heat remains satisfied after a predetermined period of time, the thermal reduction comprising: decreasing a target temperature of the energy transfer medium within the boiler a first predetermined temperature interval upon or subsequent to the demand for heat; and resetting the target temperature to the sum of the previous target temperature minus the first predetermined temperature interval; providing a system shut-off if the energy transfer medium exceeds a predetermined safety value; and combining the thermal reduction with low water cut-off protection for limiting the boiler heating system operation if the energy transfer medium volume is below a predetermined level, or with a boiler temperature limiting option, or a combination thereof.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1-3 of the drawings in which like numerals refer to like features of the invention.

A heating system is designed to provide a near constant room temperature inside a dwelling regardless of outdoor temperature fluctuations. As the outdoor temperature drops, the rate at which the dwelling loses heat increases. Conversely, when the outdoor temperature increases, the dwelling is able to retain heat longer. For example, when the temperature of a room within a structure falls below a predetermined set point, e.g., 66°, the thermostat switches ON and activates the heating system to heat and circulate the energy transfer medium through conduits to a heat exchanger within the room, such as a radiator. This generally causes the temperature within the room to rise, although such factors as outside air temperature, thermal insulation, and heat exchanger efficiency play important roles in the time-rate-of-change of the temperature of the room. When the room temperature reaches a predetermined level, e.g., 68°, the thermostat switches OFF, deactivating the heating system. Heat then begins once again to dissipate from the room at a rate dependent upon the thermal insulation and outside environment temperature.

As the outdoor temperature declines and the heat loss of the dwelling increases, the heating system typically requires more time to satisfy the heat demand. As a result, thermostat calls increase in duration, and especially so in situations where there is inadequate thermal insulation or diminished heat exchanger capacity or efficiency. As outdoor temperatures rise, the heating system is able to satisfy the heat demand more quickly. Thus, in warmer environs, the thermostat calls are shorter in duration and spaced further apart. These scenarios and external factors make it difficult to adjust the temperature of the energy transfer medium within the boiler to an optimum level.

The present invention utilizes thermal targeting technology to continually adjust the boiler temperature to the minimum necessary to achieve the required heating load.

Figure 1:
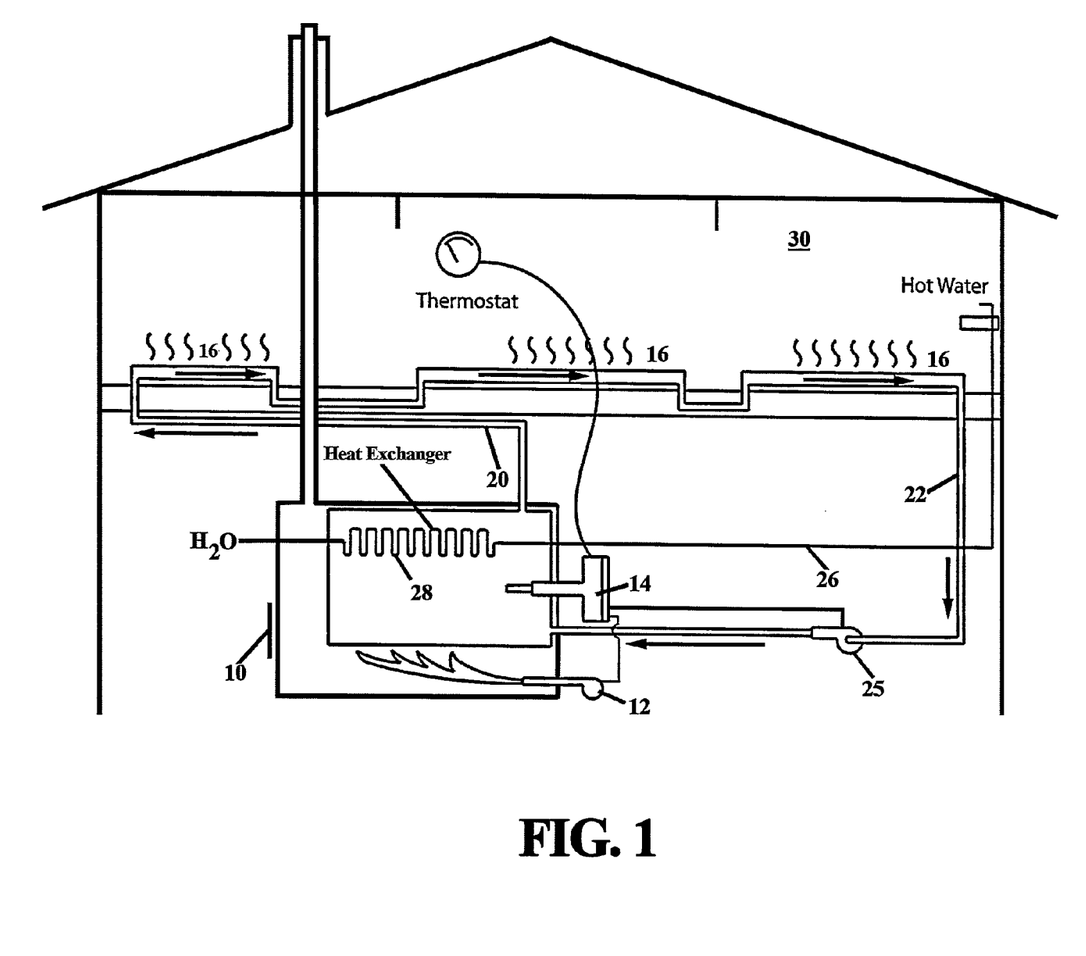
FIG. 1 is a diagram of a heating system utilizing the thermal reduction algorithm of the present invention for enhancing efficiency of a heating system.

Referring to FIG. 1, a boiler 10 provides the heat energy to warm a space 30, such as a room or zone in a residential or commercial building. An energy transfer medium, such as a fluid, or the like, in boiler 10 is heated by burner 12, which is controlled by control circuitry or controller 14. The energy transfer medium receives the heat energy from burner 12 and is pumped to heat exchanger 16 by circulator 25 through outflow line or conduit 20. Outflow line 20 connects to, and is in fluid communication with, a heat exchanger 16, such as a radiator, and the like, in space 30. As the energy transfer medium flows through heat exchanger 16, heat from the energy transfer medium is converted by heat exchanger 16, and ultimately warms space 30. In a forced, hot water heating system, the energy transfer medium is water. Upon return from heat exchanger 16, the energy transfer medium flows to inflow line or conduit 22, and returns back to boiler 10. Sensors, for example temperature sensors in hot water systems, are used to monitor the temperature of the energy transfer medium in flow lines 20, 22, or within boiler 10, or any combination thereof. Domestic hot water may also be supplied by boiler 10. Heat exchanger 28 is located within boiler 10, which receives water from an external supply and heats the water by transferring heat energy from the boiler. Domestic hot water then traverses through conduit 26 which delivers the hot water to the demand site.

In the present invention, controller 14 establishes a boiler target temperature, $T_{target}$, for the energy transfer medium within boiler 10, and upon a call or demand for heat, circulator 25 is activated, and burner 12 is fired until the target temperature is reached. The target temperature is derived from the previous heating cycle target temperature. The present invention reduces the previous heating cycle target temperature in a manner that is responsive to and initiated by a call for heat, and upon or subsequent to the call for heat, establishing a lower target temperature, $T_{target}$. Although this thermal reduction of the boiler target temperature appears contrary to the application of the heating system upon a demand for heat, it provides the salient efficiency enhancement of the present invention.

The controller 14 maintains the energy transfer medium temperature within a differential range, $\Delta T_{diff}$, about the newly set target temperature, such that the boiler temperature remains in the range of $T_{target} \pm \Delta T_{diff}$. Preferably, there will be a sliding scale for a differential off the target temperature, although constant differential temperature values may certainly be accommodated. The differential temperatures based on a sliding scale are preferably dependent upon the absolute value of the target temperature in order to avoid a situation where the boiler target temperature is held at too low of a temperature. In this manner, as the target temperature is initially reduced with each call, each lower target temperature value will be associated with a smaller amount of differential or deviation. Thus, $\Delta T_{diff}$ will be lower in absolute value when associated with lower boiler target temperatures, and higher in absolute value when associated with higher boiler target temperatures.

Responsive to and initiated by a demand for heat, controller 14 is programmed to set the boiler target temperature lower, upon or subsequent to the demand for heat, which provides a thermal reduction to the previous target temperature of the energy transfer medium within boiler 10 by a temperature, $\Delta T$. Thus, the new boiler target temperature becomes the previous boiler target temperature minus the thermal reduction temperature: $T_{target(new)} = T_{target(old)} - \Delta T_{reduce}$. Based on this new temperature value, the differential or variance is then applied to give the boiler target temperature an operating range: $T_{target(new)} \pm \Delta T_{diff}$. A call timer is initiated once the energy transfer medium reaches the newly reduced target temperature. If the demand for heat is satisfied within a predetermined set time interval, $t_{set}$, responsive to and initiated by the next call for heat, the previous target temperature is again reduced, upon or subsequent to the call for heat, while the system attempts to meet the new heat demand within the time interval $t_{set}$. If the demand for heat is not satisfied when the call timer reaches the predetermined set time interval, $t_{set}$, the boiler target temperature is increased in temperature a predetermined amount, which is referred to as a thermal boost, $\Delta T_{boost}$. Preferably, the thermal boost is in a constant temperature interval, although it may be in any predetermined interval predicated upon other system characteristics and environmental conditions, and could be represented by a function rather than a constant. In this manner, the new target temperature becomes $T_{target} + \Delta T_{boost}$, where $T_{target}$ represents the previously reduced target temperature value based on the initial thermal reduction algorithm.

In a preferred embodiment, the logic control circuitry would evaluate and adjust the target temperature ($T_{target}$) of the energy transfer medium at a set time interval, for example, at $t_{set} = 20$ minutes, although as previously discussed, other set time intervals may be preferred, and can be accommodated for different heating system configurations and structure considerations. Predetermined temperature selections may also be based on overlapping calls for heat in a multi-zoned structure. It is envisioned that an operator may adjust or preselect the set time using preselected time intervals such that, for example, $t_{set}$ may be selected by the operator from a range of values where $t_{set} = 10, 15, 20, 25, 30, 35, 40,$ or $45$ minutes, or $t_{set}$ may be represented analytically as a function of time or temperature.

If, upon thermal reduction of the target temperature pursuant to the method of the present invention, the demand for heat is satisfied within the set time period, $t_{set}$, then there is an immediate energy savings insomuch as the boiler target temperature is repeatedly lowered with each call for heat satisfied within the set time period, $t_{set}$, but in each case is still able to accommodate the demand for heat. If, however, the demand for heat is not satisfied within a given time period, $t_{set}$, the temperature of the energy transfer medium in the boiler, T, is considered to be insufficiently low. Burner 12 is ordered to fire, and the energy transfer medium within boiler 10 is heated to a higher target temperature, increased by the thermal boost: $T=T_{target}+\Delta T_{boost}$. In one embodiment, $\Delta T_{boost}$ is set at a predetermined amount, such as ten degrees (10° F.), above the initial energy transfer medium temperature setting, $T_{target}$, although this predetermined amount may be represented by other constant values, or other functional relationships, and the invention is not limited to a single value. This cycle is repeated until the heat demand is satisfied.

Heat efficiency gains are significantly realized when the heating system is subjected to different outside environments. When the outside environment warms, the heating system does not have to work as hard to provide heat energy to the structure, since heat dissipation from the structure is considerably reduced. The boiler target temperature could conceivably be running too hot for delivering the amount of heat energy necessary to maintain consistent heat in a slowly dissipating structure. In this scenario, the thermal reduction feature of the present invention governs the enhanced efficiency algorithm.

The boiler target temperature will be initially reduced responsive to and initiated by a call for heat, and upon or subsequent to the call for heat, by a predetermined amount, such that $T_{target}=-\Delta T_{reduce}$. If the demand for heat is satisfied before the $t_{set}$ point is reached, the system ceases providing additional heat energy until the next heat demand. Responsive to and initiated by the next call for heat, and upon or subsequent to this next call for heat, the boiler target temperature is again reduced by the predetermined amount, $\Delta T_{reduce}$, and the new target temperature is again represented as $T_{target}=(T_{initial}-\Delta T_{reduce})-\Delta T_{reduce}=T_{initial}-2\Delta T_{reduce}$. Each time the heat demand is satisfied, the boiler target temperature is reduced responsive to and initiated by the next call for heat, and upon or subsequent to the next call for heat. Under this scenario the thermal reduction algorithm may be generally represented in the following manner:

$$T_{target}=(T_{initial}-N_r{}^*\Delta T_{reduce})$$

where, $T_{initial}$=initial or previous boiler target temperature
$\Delta T_{reduce}$=temperature reduction factor; and
$N_r$=number of thermal reductions;

Once the energy transfer medium reaches the target level, a call timer is activated and $t_{set}$ is monitored. If the demand for heat is not satisfied within time period $t_{set}$, a thermal boost is performed. An analytical representation of the thermal boost scenario is determined in the following manner. Once it is understood that the heat demand is not satisfied after the predetermined time interval, $t_{set}$, a first thermal boost is administered. Upon thermal boost, the call timer is reset. Subsequent thermal boosts are then administered at each time interval $t_{set}$ until the heat demand is met or a system temperature limit is achieved. Under this scenario, this portion of the system algorithm representing boiler target temperature may be expressed as follows:

$$T_{target}=[(T_{initial}-\Delta T_{reduce})+(N_b{}^*\Delta T_{boost})]$$

where, $T_{initial}$=initial or previous boiler target temperature;
$\Delta T_{reduce}$=temperature reduction factor;
$\Delta T_{boost}$=temperature boost factor; and
$N_b$=number of thermal boosts Thus, in situations where the heat demand cannot be satisfied within a set time interval, the boiler target temperature which was initially reduced by a temperature $\Delta T_{reduce}$, is then raised by a temperature $\Delta T_{boost}$. For each subsequent time interval, $t_{set}$, for which the demand for heat remains unsatisfied, a subsequent thermal boost is performed. The temperature increase is preferably the same increase established for the first thermal boost interval, although any temperature increase algorithm may be adopted, and the present invention is not limited to a single or constant temperature increase. For example, the subsequent temperature increases may follow a decreasing exponential function in relation to the thermal dissipation realized by the space being heated.

As an illustrative example in a warm environ, where the outside temperature is rapidly rising, and assuming an initial boiler target temperature of 165° F., a thermal reduction temperature of 5° F., and a thermal boost temperature of 10° F., a first call for heat would reduce the boiler target temperature such that $T_{target}=165°$ F.$-5°$ F.$=160°$ F. $[T_{target}=T_{initial}-\Delta T_{reduce}]$. After a set time, $t_{set}$, due to the warm outside environment or slow heat dissipation from the structure, the demand for heat is presumably satisfied. Responsive to and initiated by the next call for heat, and upon or subsequent to this next call for heat, a new target temperature is set based upon another thermal reduction: $T_{target}=160°$ F.$-5°$ F.$=155°$ F. $[T_{target}=T_{initial}-2*\Delta T_{reduce}]$. Continuing with this logic, if prior to another set time period, $t_{set}$, the demand for heat is again satisfied, the new boiler target temperature responsive to or initiated by the next call for heat will be adjusted for another reduction upon or subsequent to this next call for heat: 155° F.$-5°$ F.$=150°$ F. $[T_{target}=T_{initial}-3*\Delta T_{reduce}]$. In each instance, the target temperatures are set and the new boiler target temperature operating range is $T_{target}\pm\Delta T_{diff}$.

As an illustrative example of the second scenario, in a cold environ where the outside temperature is rapidly falling, assuming an initial boiler target temperature of 165° F., a thermal reduction temperature of 5° F., and a thermal boost temperature of 10° F., a first call for heat would reduce the boiler target temperature such that $T_{target}=165°$ F.$-5°$ F.$=160°$ F. $[=T_{initial}-\Delta T_{reduce}]$. Assuming that after a set time, $t_{set}$, due to the cold outside environment, the demand for heat is still not satisfied, a new target temperature is set based on a thermal boost: $T_{target}=160°$ F.$+10°$ F.$=170°$ F. $[=T_{target(previous)}+\Delta T_{boost}]$. Continuing with this logic, after another set time period, $t_{set}$, assuming the demand for heat is still not met, the new boiler target temperature is adjusted by another thermal boost: $T_{target}=170°$ F.$+10°$ F.$=180°$ F. $[=(T_{initial}-\Delta T_{reduce})+N_b{}^*\Delta T_{boost}]$. In each instance, the target temperatures are set and the new boiler target temperature operating range is $T_{target}\pm\Delta T_{diff}$.

This cycle is repeated if the demand for heat remains unsatisfied or until the energy transfer medium's temperature reaches a predetermined system maximum, which is typically based upon operational safety considerations.

An additional efficiency measure, which may be used in conjunction with the above stated thermal reduction algorithm, is to decrease the boiler target temperature whenever a second predetermined time interval $t_{set2}$ has been realized without any call or demand for heat. For instance, if there has not been a call for heat within thirty minutes ($t_{set2}=30$ minutes), the control circuitry would decrease the target temperature of the energy transfer medium within the boiler by a predetermined value $\Delta T_{reduce2}$.

Figure 2:
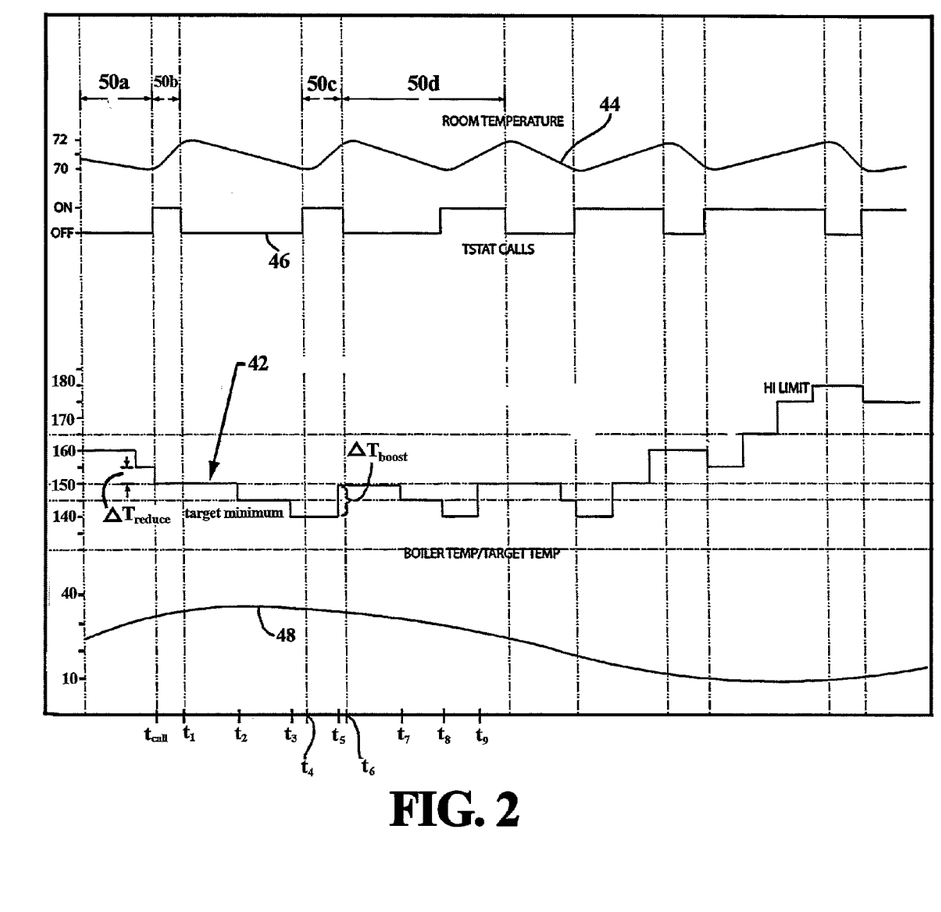
FIG. 2 depicts a timing diagram exemplifying the thermal reduction algorithm of the present invention.

FIG. 2 depicts a timing diagram exemplifying the thermal efficiency algorithm of the present invention in instances where the outside temperature is first rising and then falling. The x-axis represents time and the y-axis represents temperature. The variable thermostat temperature reading in the space being heated is depicted by line 44. Thermostat ON-OFF calls are depicted by line 46. Prior to a call for heat, thermostat reading in section 50*a* is shown having a drop in temperature, indicating that the space being monitored has cooled off. In this time period, the outside temperature, represented by line 48 is shown rising, i.e., the temperature outside the structure is increasing. If the thermostat reading drops a certain amount below a predetermined set point, for example two degrees (2° F.) below the set room temperature, there will be a call for heat, identified as time $t_{call}$. The thermostat call will be activated (ON) as shown in section 50*b*.

At this time, $t_{call}$, the heat efficiency algorithm of the present invention is initiated. Responsive to and initiated by a call for heat, the boiler target temperature is reduced by a predetermined amount, $\Delta T_{reduce}$, upon or subsequent to this call for heat. In this illustrative example, the thermal reduction is responsive to and initiated by the call for heat, and applied immediately upon the call for heat; but the present invention is not limited to the particular time when the thermal reduction is made, and in fact, the thermal reduction may be performed any time from immediately at the onset of the call for heat to a time subsequent thereto. The burner and circulator are turned on, and the temperature within the boiler is brought up to this reduced target temperature within a predefined differential value. Once the boiler is at target temperature the burner is turned off and a new time clock starts measuring time interval $t_{set}$ during thermostat activation, and the system continues to run until the heat demand is satisfied or $t_{set}$ reaches a predetermined value. In this first instance, the system is shown satisfying the heat demand before $t_{set}$ reaches its predetermined limit, and the thermostat call is turned OFF at time $t_1$.

At a later time $t_2$, the system still does not require another call for heat. If the time between $t_2$ and $t_1$ is greater than or equal to a predetermined set interval $t_{set2}$ for thermostat deactivation, which monitors the time between calls for heat, the boiler target temperature is again reduced at time $t_2$. Since the outside environment continues to warm during this time period, it is anticipated that there will be fewer calls for heat, and the reduction in boiler target temperature provides an efficiency enhancement. Following the logic shown by the chart, a second time interval of $t_{set2}$ is reached at time $t_3$, such that $t_3-t_2=t_{set2}$, where the boiler target temperature is again reduced. Again, the thermal reduction algorithm of the present invention is lowering the boiler target temperature at each opportunity in order to enhance the heating system efficiency.

At time $t_4$, which is the start of section 50*c*, the outside environment is shown cooling off with decreasing temperature, and there is a second call for heat; thermostat activation 46 is ON. Under the current thermal reduction algorithm, the first action would be to lower the boiler target temperature by an amount $\Delta T_{reduce}$; however, at this temperature point in the system operation a predetermined target minimum limit has been met. Consequently, the boiler target temperature remains at this low point and the heating system attempts to satisfy the call for heat. As shown at time $t_5$, the heat demand remains unsatisfied. In this example, the difference between $t_5$ and $t_4$ is the predetermined set interval $t_{set}$, such that $t_5-t_4=t_{set}$, which means the heating system has been unable to adequately heat the structure during the time interval $t_{set}$ at this boiler target temperature limit. Thus, a thermal boost is employed at time $t_5$. The thermal boost raises the boiler target temperature, and a new time clock is reset while the heating system continues to provide heat. A short time later, $t_6$, the demand for heat is shown to have been satisfied. The boiler target temperature remains at the boosted temperature and a new time clock starts for measuring the next $t_{set2}$ interval.

At this stage, the outside environment and the room temperature are shown in section 50*d* as cooling off. Once again a time interval $t_{set2}$ is shown being met at time $t_7$, such that $t_7-t_6=t_{set2}$, without having a call for heat. The thermal reduction algorithm is employed at $t_7$ and the boiler target temperature is decreased by an amount $\Delta T_{reduce}$. As shown, the outside environment decreases in temperature, the room temperature decreases as well, and by time $t_8$, the third thermostat call is activated. The system employs the thermal reduction algorithm and reduces the boiler target temperature by an amount $\Delta T_{reduce}$. The heating system runs at this temperature until $t_9$, where $t_9-t_8=t_{set}$, and the call for heat remains active. At this point, a thermal boost is initiated and the heating system runs at this increased boiler temperature.

Figure 3:
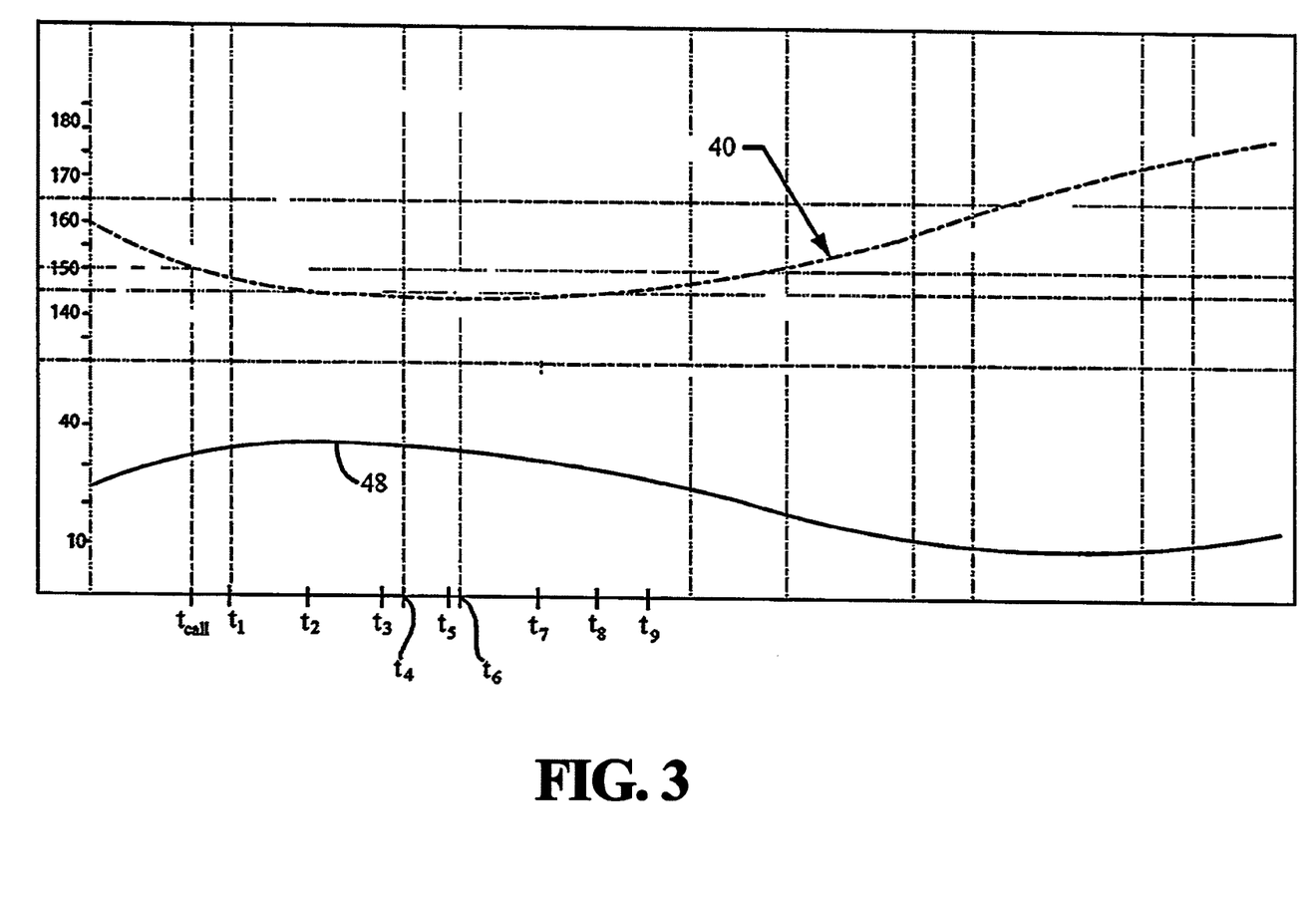
FIG. 3 is a timing diagram contrasting the average boiler temperature and the outside temperature.

FIG. 3 is a timing diagram contrasting the average boiler temperature 40 with the outside temperature 48 when the heating system is operated pursuant to the present invention. As depicted in FIG. 3, the average boiler temperature will inversely follow the outside temperature.

This cycle repeats with obvious increases in the amount of thermal reductions to the boiler target temperature during times of warmer outside temperatures, and increases in the amount of thermal boosts to the boiler target temperature during times of cooler outside temperatures.

An additional measure is implemented within the thermal boost scheme of the present invention, which is the added monitoring of the system's duty cycle. If the duty cycle of the thermostat exceeds a given value, such as ninety percent (90%), the thermostat interruptions will be treated as a continuous call by the present invention's thermal targeting functions. The duty cycle is preferably monitored in a rolling measurement, for example, over a one hour period in one minute time intervals. Added duty cycle monitoring allows the heating system to check itself under dynamic conditions where temperature reductions would not be desirable or would result in the system's inability to provide adequate heat. For example, if the duty cycle is ninety percent (90%), there is probably no need to bring down the temperature as the system normally would do in a less aggressive duty cycle mode. Thermal boosting continues until the duty cycle decreases, or the system's operational temperature limit is reached.

The present invention may be utilized in tandem with other protective features and options associated with boiler operation. For example, low water cut-off and boiler temperature limiting options may be employed concurrently with the present invention, and may be operated or controlled by controller 14.

Salient features of the present invention include the systematic operation of decreasing incrementally the temperature of the boiler target temperature and the energy transfer medium within the boiler in order to save energy during operation. Preferred variable thermal reductions at predetermined time intervals, and thermal boosts, or a combination thereof are employed to achieve greater thermal efficiency of the heating system.

While the present invention has been particularly described, in conjunction with a specific preferred embodiment, it is evident that many alternatives, modifications and variations will be apparent to those skilled in the art in light of the foregoing description.

It is therefore contemplated that the appended claims will embrace any such alternatives, modifications and variations as falling within the true scope and spirit of the present invention.

Thus, having described the invention, what is claimed is:

1. A method of improving efficiency of a boiler heating system including adjusting boiler target temperature during heating system operation, said method comprising:
reducing said boiler target temperature a predetermined amount, $\Delta T_{reduce}$, to a reduced target temperature, such that said reducing is responsive to and initiated by a call for heat, and occurs upon or subsequent to said call for heat;
running said heating system at said reduced target temperature;
if said call for heat is satisfied while running heating system at said reduced target temperature:
measuring time from a point at which said call for heat is satisfied; and
reducing said boiler target temperature said predetermined amount, $\Delta T_{reduce}$, each time a predetermined set time interval, $t_{set}$, is reached without a subsequent call for heat.

2. The method of claim 1 including, if after a predetermined set time interval, $t_{set}$, said call for heat is unsatisfied at said reduced target temperature, increasing said boiler target temperature a predetermined amount, $\Delta T_{boost}$, and running said heating system at said increased target temperature.

3. The method of claim 2 including, if said call for heat remains unsatisfied after said boiler target temperature has been raised said predetermined amount, $\Delta T_{boost}$, for said predetermined set time interval, $t_{set}$, measured from said increased target temperature:
increasing said boiler target temperature said predetermined amount, $\Delta T_{boost}$, each time said predetermined set time interval, $t_{set}$, is reached without having satisfied said call for heat; and
running said heating system at the increased target temperature.

4. The method of claim 3 including, once said call for heat is satisfied, reducing said boiler target temperature said predetermined temperature amount, $\Delta T_{reduce}$, such that said reducing is responsive to and initiated by a subsequent call for heat, and occurs upon or subsequent to said subsequent call for heat.

5. The method of claim 1 wherein said reducing said boiler target temperature said predetermined temperature amount, $\Delta T_{reduce}$, is calculated based on a constant value, a sliding scale, or a predetermined function.

6. The method of claim 1 wherein said predetermined set time interval, $t_{set2}$, is calculated based on a constant value, a sliding scale, or a predetermined function.

7. The method of claim 2 wherein said predetermined set time interval, $t_{set}$, is calculated based on a constant value, a sliding scale, or a predetermined function.

8. The method of claim 2 wherein said predetermined set time interval $t_{set}$ is equal to said predetermined set time interval $t_{set2}$.

9. The method of claim 2 wherein temperature increase value $\Delta T_{boost}$ is calculated based on a constant value, a sliding scale, or a predetermined function.

10. The method of claim 2 including monitoring a duty cycle of calls for heat such that if the duty cycle exceeds a predetermined value, said predetermined set time interval, $t_{set}$, is continued, disregarding interruptions in heat calls.

11. A method of improving efficiency of a boiler heating system including adjusting boiler target temperature during heating system operation, said method comprising:
reducing said boiler target temperature a predetermined amount, $\Delta T_{reduce}$, to a reduced target temperature, such that said reducing is responsive to and initiated by a call for heat, and occurs upon or subsequent to said call for heat;
running said heating system at said reduced target temperature;
if after a predetermined set time interval, $t_{set}$, said call for heat is unsatisfied at said reduced target temperature, increasing said boiler target temperature a predetermined amount, $\Delta T_{boost}$, and running said heating system at said increased target temperature; and
monitoring said duty cycle in a rolling measurement.

12. The method of claim 11 wherein said monitoring includes measuring said duty cycle over a period of one (1) hour in multiple time segments.

13. A method of improving efficiency of a boiler heating system for heating a structure, said boiler heating system comprising:
a burner;
a controller in communication with said burner for adjusting boiler target temperature;
a first temperature measurement device for measuring said boiler heating system temperature, said first temperature measurement device in communication with said controller;
a second temperature measurement device for measuring temperature of said structure, said second temperature measurement device in communication with said controller;
said method comprising:
adjusting said boiler target temperature during heating system operation, by reducing said target temperature a predetermined amount to a reduced target temperature, $\Delta T_{reduce}$, such that said reducing is responsive to and initiated by a call for heat, and occurs upon or subsequent to said call for heat, said call for heat triggered by said second temperature measurement device communicating with said controller;
running said heating system at said reduced target temperature by having said controller communicate with and activate a circulator or said burner;
if said call for heat is satisfied while running said heating system at said reduced target temperature:
measuring elapsed time from a time at which a call for heat was satisfied; and
reducing said boiler target temperature a predetermined amount, $\Delta T_{reduce}$, each time a first predetermined set time interval is reached without a subsequent call for heat;
if said call for heat is unsatisfied while running said heating system at said reduced target temperature:
measuring elapsed time from a time when said target temperature was met; and
increasing said boiler target temperature a predetermined amount, $\Delta T_{boost}$, after said elapsed time equals to or exceeds a second predetermined set time interval; and
running said heating system at said increased target temperature.

14. The method of claim 13 including, if said call for heat remains unsatisfied after said boiler target temperature has been raised said predetermined amount, $\Delta T_{boost}$, at said second predetermined set time interval measured from said previous increase in target temperature:

increasing said target temperature said predetermined amount, $\Delta T_{boost}$, each time said second predetermined set time interval is reached without having satisfied said call for heat; and running said heating system at the increased target temperature.

15. The method of claim 14 including, once said call for heat is satisfied, reducing said boiler target temperature said predetermined temperature amount, $\Delta T_{reduce}$, such that said reducing is responsive to and initiated by a subsequent call for heat, and occurs upon or subsequent to said subsequent call for heat.

16. A method of improving the efficiency of a heating system comprising:

setting a predetermined target temperature for an energy transfer medium within a boiler in said heating system;

measuring a dynamic temperature of said energy transfer medium within said boiler as a function of time;

responsive to and initiated by a demand for heat for a zoned space within a structure heated by said heating system:

reducing said target temperature a predetermined amount upon or subsequent to said demand for heat;

circulating said energy transfer medium through said heating system to at least one heat exchanger within said zoned space at said reduced target temperature;

initiating a timer when said dynamic temperature of said energy transfer medium is approximately equal to said predetermined target temperature;

if said demand for heat is satisfied while running said heating system at said reduced target temperature:

measuring elapsed time from a point at which said call for heat is satisfied; and reducing said target temperature said predetermined amount, each time a first predetermined set time interval is reached without a subsequent call for heat.

17. The method of claim 16 including, if said call for heat is unsatisfied while running said heating system at said reduced target temperature:

measuring elapsed time from when said dynamic temperature of said energy transfer medium is approximately equal to said reduced target temperature;

sending a firing signal to a burner within said heating system if said dynamic temperature of said energy transfer medium within said boiler is less than said predetermined target temperature within a predetermined differential temperature limit for said energy transfer medium;

increasing said target temperature a predetermined amount, $\Delta T_{boost}$, after said elapsed time equals to or exceeds a second predetermined set time interval; and running said heating system at said increased target temperature.

18. A method of improving the efficiency of a heating system comprising:

setting a predetermined temperature for a zoned space within a structure heated by said heating system;

setting a predetermined target temperature for an energy transfer medium within a boiler in said heating system;

measuring a dynamic temperature of said energy transfer medium within said boiler as a function of time;

measuring a dynamic temperature of said zoned space as a function of time;

triggering a call for heat upon a comparison of said temperature of said zoned space to said predetermined temperature for said zoned space, such that if said comparison is greater than a predetermined temperature difference said call for heat is initiated;

responsive to and initiated by said call for heat:

reducing said predetermined target temperature by a temperature reduction factor upon or subsequent to said call for heat;

circulating said energy transfer medium through said heating system to at least one heat exchanger within said zoned space; and sending a firing signal to a burner within said heating system if said dynamic temperature of said energy transfer medium within said boiler is, within a predetermined differential temperature range, less than said predetermined target temperature minus said temperature reduction factor;

initiating a timer when said dynamic temperature of said energy transfer medium is approximately equal to said predetermined target temperature minus said temperature reduction factor for said energy transfer medium;

if said call for heat is satisfied within a first set time interval:

reducing current target temperature by said temperature reduction factor, and continuing to reduce the current target temperature by said temperature reduction factor each time said first set time interval has elapsed without a subsequent call for heat.

19. The method of claim 18 including, if said call for heat is not satisfied within a second set time interval:

providing a thermal boost to said energy transfer medium by raising said dynamic temperature of said energy transfer medium by a temperature increase factor;

resetting said predetermined target temperature to a level approximately equal to the sum of said predetermined target temperature minus said temperature reduction factor plus said temperature increase factor; and continuing to increase current target temperature by said temperature increase factor each time said second set time interval has elapsed without satisfying said call for heat.

20. The method of claim 19 including setting target temperature maximum and minimum levels such that temperature reductions and temperature increases do not exceed heating system operational limits.

21. A method of improving efficiency of a boiler heating system including the steps of:

providing a thermal reduction to the energy transfer medium within said boiler responsive to and initiated by a demand for heat to said heating system, or when said demand for heat remains satisfied after a predetermined period of time, said thermal reduction comprising:

decreasing a target temperature of said energy transfer medium within said boiler a first predetermined temperature interval upon or subsequent to said demand for heat; and resetting said target temperature to the sum of a previous target temperature minus said first predetermined temperature interval;

providing a system shut-off if said energy transfer medium exceeds a predetermined safety value; and combining said thermal reduction with low water cut-off protection for limiting said boiler heating system operation if said energy transfer medium volume is below a predetermined level, or with a boiler temperature limiting option, or a combination thereof.

22. The method of claim 21 including decreasing said predetermined target temperature by a second temperature interval, said decreasing responsive to or initiated by a second or subsequent call for heat, and upon or subsequent to said second or said subsequent call for heat, or whenever a specified time has elapsed before said second or subsequent call for heat is initiated.

\* \* \* \* \*

UNITED STATES PATENT AND TRADEMARK OFFICE
CERTIFICATE OF CORRECTION

PATENT NO. : 9,851,111 B1
APPLICATION NO. : 14/339483
DATED : December 26, 2017
INVENTOR(S) : Richard A. Lyons et al.

It is certified that error appears in the above-identified patent and that said Letters Patent is hereby corrected as shown below:

In the Specification

In Column 9 Line 24:
Delete "$T_{target} = - \Delta T_{reduce}$" and substitute therefore -- $T_{target} = T_{initial} - \Delta T_{reduce}$ --

In the Claims

In Column 13 Line 23 (Claim 1):
Delete "$t_{set}$" and substitute therefore -- $t_{set2}$ --

Signed and Sealed this
Thirty-first Day of July, 2018

Andrei Iancu
*Director of the United States Patent and Trademark Office*